(12) United States Patent
Yamazaki et al.

(10) Patent No.: US 11,935,669 B2
(45) Date of Patent: Mar. 19, 2024

(54) METHOD FOR DISPERSING CONDUCTIVE PARTICLES, AND ELECTROSTATIC ADSORPTION DEVICE

(71) Applicants: Resonac Corporation, Tokyo (JP); NATIONAL UNIVERSITY CORPORATION YAMAGATA UNIVERSITY, Yamagata (JP)

(72) Inventors: Shohei Yamazaki, Tokyo (JP); Hiroyuki Izawa, Tokyo (JP); Toshiyuki Sugimoto, Yamagata (JP)

(*) Notice: Subject to any disclaimer, the term of this patent is extended or adjusted under 35 U.S.C. 154(b) by 0 days.

(21) Appl. No.: 17/775,886

(22) PCT Filed: Nov. 10, 2020

(86) PCT No.: PCT/JP2020/041909
§ 371 (c)(1),
(2) Date: May 11, 2022

(87) PCT Pub. No.: WO2021/095726
PCT Pub. Date: May 20, 2021

(65) Prior Publication Data
US 2022/0392670 A1 Dec. 8, 2022

(30) Foreign Application Priority Data

Nov. 12, 2019 (JP) ................................ 2019-204741
Aug. 7, 2020 (JP) ................................ 2020-134877

(51) Int. Cl.
*H01B 13/00* (2006.01)
*B05D 1/00* (2006.01)
*B01J 19/08* (2006.01)

(52) U.S. Cl.
CPC ......... *H01B 13/0033* (2013.01); *B05D 1/007* (2013.01); *B01J 19/08* (2013.01); *B01J 19/087* (2013.01)

(58) Field of Classification Search
CPC ...... B05D 1/007; H01B 13/0033; B01J 19/08; B01J 19/087
(Continued)

(56) References Cited

U.S. PATENT DOCUMENTS 4,780,331 A * 10/1988 Cobbs, Jr. ................ B05D 1/06
118/621
4,876,561 A * 10/1989 Schmidlin ............ G03G 15/346
347/55
(Continued)

FOREIGN PATENT DOCUMENTS

| CN | 1416028 | 5/2003 |
|---|---|---|
| CN | 1504821 | 6/2004 |

(Continued)

OTHER PUBLICATIONS

International Search Report dated Jan. 12, 2021 for PCT/JP2020/041909.
(Continued)

*Primary Examiner* — Brian K Talbot
(74) *Attorney, Agent, or Firm* — SOEI PATENT & LAW FIRM

(57) ABSTRACT

A method for dispersing conductive particles includes: forming an electric field between a first electrode and a second electrode of an electrostatic adsorption device including the first electrode including a disposition part having electrostatic diffusivity or conductivity on which particles are disposed and the second electrode including an adsorption part having electrostatic diffusivity or conductivity and facing the disposition part, to cause a blend particle in which the conductive particles each having a particle size smaller than a particle size of an intermediate particle are attached to the intermediate particle and which is disposed on the disposition part, to reciprocate between the disposition part
(Continued)

and the adsorption part, and to cause the conductive particles to be adsorbed onto the adsorption part.

9 Claims, 12 Drawing Sheets

(58) Field of Classification Search
USPC .......................................................... 427/458
See application file for complete search history.

(56) References Cited

U.S. PATENT DOCUMENTS

| | | | | |
|---|---|---|---|---|
| 5,279,863 | A * | 1/1994 | Escallon | B05D 1/06 118/325 |
| 5,445,852 | A * | 8/1995 | Sugai | B05B 5/087 427/191 |
| 6,200,643 | B1 * | 3/2001 | Sugai | B05D 1/007 427/475 |
| 6,342,273 | B1 * | 1/2002 | Handels | D21H 23/50 427/598 |
| 8,771,802 | B1 * | 7/2014 | Hays | G03G 15/346 427/458 |
| 2004/0045659 | A1 * | 3/2004 | Kobayashi | B05B 5/12 156/279 |
| 2012/0100364 | A1 * | 4/2012 | Yoon | C30B 29/60 428/323 |
| 2015/0190840 | A1 * | 7/2015 | Muto | B01J 2/10 118/696 |
| 2016/0243764 | A1 * | 8/2016 | Hays | B29C 64/153 |

FOREIGN PATENT DOCUMENTS

| | | | |
|---|---|---|---|
| JP | S58-077575 | | 5/1983 |
| JP | H6-013784 | | 1/1994 |
| JP | 2000-017455 | | 1/2000 |
| JP | 2000-149677 | | 5/2000 |
| JP | 2008-137122 | * | 6/2008 |
| JP | 2009-223154 | | 10/2009 |
| JP | 2012-521306 | | 9/2012 |
| JP | 2012-523311 | | 10/2012 |

OTHER PUBLICATIONS

International Preliminary Report on Patentability with Written Opinion dated May 27, 2022 for PCT/JP2020/041909.

* cited by examiner (a)

(b)

(a)

(b)

(a)

(b)

(a)

(b)

METHOD FOR DISPERSING CONDUCTIVE PARTICLES, AND ELECTROSTATIC ADSORPTION DEVICE

CROSS-REFERENCE TO RELATED APPLICATIONS

This application is a 35 U.S.C. § 371 national phase application of PCT/JP2020/041909, filed on Nov. 11, 2020, which claims priority to Japanese Patent Application No. 2019-204741, filed on Nov. 12, 2019, and Japanese Patent Application No. 2020-134877, filed on Aug. 7, 2020.

TECHNICAL FIELD

The present invention relates to a method for dispersing conductive particles.

BACKGROUND ART

As a method for two-dimensionally arranging particles on a base material, a dip coating method in which the base material is immersed in a dispersion liquid in which spherical particles are dispersed, the base material is lifted up, and then the dispersion medium is dried and removed, a convective assembly method, and the like have been known (for example, refer to following Patent Literature 1).

CITATION LIST

Patent Literature

Patent Literature 1: Japanese Unexamined Patent Publication No. 2009-223154

SUMMARY OF INVENTION

Technical Problem

The above methods use a self-assembly phenomenon of particles and are a technique suitable when particles are disposed in the closest packing or when a particle membrane is formed. On the other hand, it may be desirable that particles are dispersed as with conductive particles on an anisotropic conductive film, and there is also a demand for a technique of two-dimensionally disposing particles to be separated from each other.

Therefore, an object of the present invention is to provide a method for dispersing conductive particles, by which conductive particles can be two-dimensionally disposed on a base material to be separated from each other.

Solution to Problem

According to one aspect of the present invention, there is provided a method for dispersing conductive particles, the method including: a step of forming an electric field between a first electrode and a second electrode of an electrostatic adsorption device including the first electrode including a disposition part having electrostatic diffusivity or conductivity on which particles are disposed and the second electrode including an adsorption part having electrostatic diffusivity or conductivity and facing the disposition part, to cause a blend particle in which the conductive particles each having a particle size smaller than a particle size of an intermediate particle are attached to the intermediate particle and which is disposed on the disposition part, to reciprocate between the disposition part and the adsorption part, and to cause the conductive particles to be adsorbed onto the adsorption part.

According to the method, the conductive particles having a small particle size which are attached to the surface of the intermediate particle having a large particle size can be adsorbed onto the adsorption part by the repetition of the reciprocation of the blend particle, namely, the movement of the blend particle to the second electrode caused by an electrostatic attractive force generated by being charged at a polarity opposite to that of the second electrode and the movement of the blend particle that has come into contact with the adsorption part, to the first electrode caused by an electrostatic repulsive force generated by being charged at the same polarity as that of the second electrode. Incidentally, the inventors infer that one of the reasons the conductive particles are adsorbed is that in terms of a magnitude relationship between a natural adsorption force and an electrostatic repulsive force acting on the particles in the adsorption part, the electrostatic repulsive force is large for the intermediate particle having a large volume and the natural adsorption force is large for the conductive particle having a small volume. In addition, according to the method, by adjusting the amount of the conductive particles attached to the intermediate particle, the adsorption density of the conductive particles on the adsorption part can be appropriately reduced, and the conductive particles can be adsorbed onto the adsorption part to be separated from each other. Then, when the adsorption part is used as a base material or the conductive particles on the adsorption part are transferred onto a predetermined base material, the conductive particles can be two-dimensionally disposed on the base material to be separated from each other.

The particle size of the intermediate particle may be 10 to 100 times the particle size of the conductive particles. In this case, the movement of the blend particles is facilitated while the agglomeration of the blend particles is suppressed.

The particle size of the conductive particles may be 2 to 20 μm.

The adsorption part may have an opening pattern that is open toward a disposition part side.

The method for dispersing conductive particles can further include a step of causing the conductive particles adsorbed onto the adsorption part, to be electrostatically adsorbed onto a second adsorption part having an insulating property and being disposed to face the adsorption part. In this case, it is easy to adjust the particle density and make intervals between the conductive particles more uniform. In addition, because of the action of reduction of the electric field caused by the adsorption of the conductive particles onto the second adsorption part having an insulating property, the electrostatic adsorption of the conductive particles can be stopped when a predetermined amount of the conductive particles are adsorbed onto the second adsorption part.

The second adsorption part may have an opening pattern that is open toward a disposition part side.

According to another aspect of the present invention, there is provided an electrostatic adsorption device including: a first electrode including a disposition part having electrostatic diffusivity or conductivity on which particles are disposed; and a second electrode including an adsorption part having electrostatic diffusivity or conductivity which faces the disposition part and which is provided with an opening pattern that is open toward a disposition part side.

Such an electrostatic adsorption device can be used as a device that disperses conductive particles using a blend particle in which the conductive particles each having a particle size smaller than that of an intermediate particle are attached to the intermediate particle.

Advantageous Effects of Invention

According to the present invention, it is possible to provide the method for dispersing conductive particles, by which the conductive particles can be two-dimensionally disposed on a base material to be separated from each other.

DESCRIPTION OF EMBODIMENTS

Figure 1:
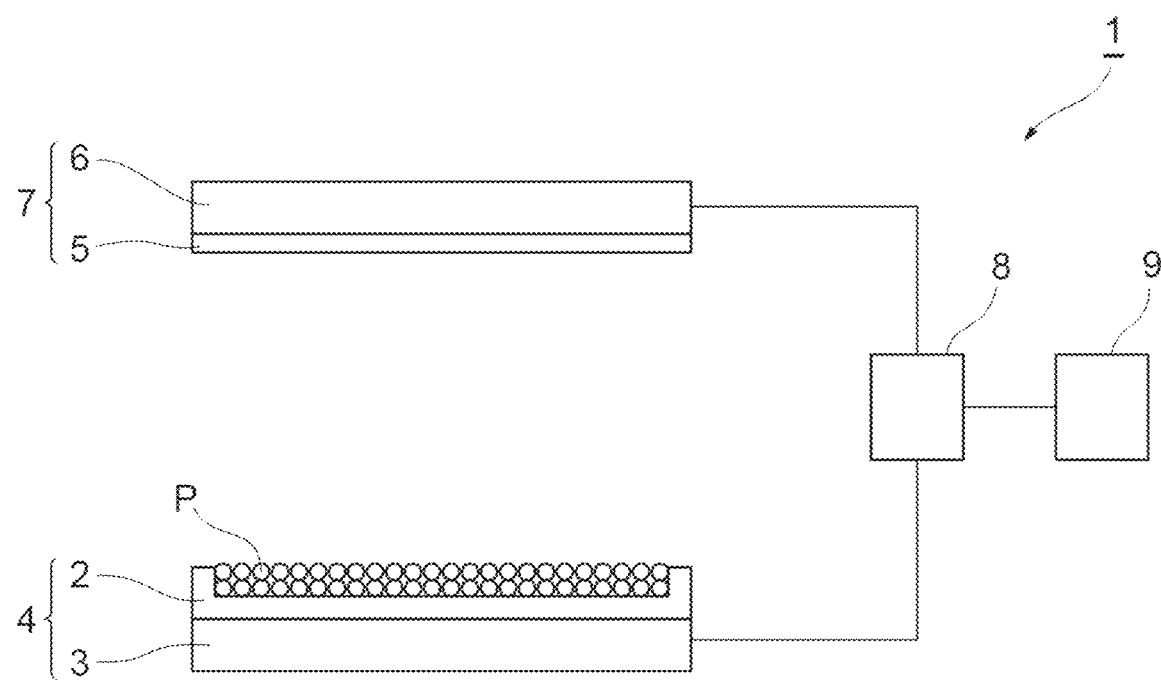
FIG. 1 is a view showing a schematic configuration of an electrostatic adsorption device used in a method for dispersing conductive particles according to one embodiment of the present invention.

Hereinafter, a mode for implementing the present invention will be described in detail with reference to the drawings as appropriate. However, the present invention is not limited to the following embodiment.

Incidentally, with regard to numerical ranges to be described in stages in the present specification, an upper limit value or a lower limit value of a numerical range of a stage may be replaced with an upper limit value or a lower limit value of a numerical range of another stage. In addition, with regard to the numerical ranges to be described in the present specification, the upper limit values or the lower limit values of the numerical ranges may be replaced with values shown in examples. In addition, in the present specification, for convenience sake, the aggregation of a plurality of conductive particles is also referred to as a "conductive particle" The same definition applies to an intermediate particle or a blend particle.

[Method for Dispersing Conductive Particles]

A method for dispersing conductive particles according to the present embodiment includes: a step of forming an electric field between a first electrode and a second electrode of an electrostatic adsorption device including the first electrode including a disposition part having electrostatic diffusivity or conductivity on which particles are disposed and the second electrode including an adsorption part having electrostatic diffusivity or conductivity and facing the disposition part, to cause a blend particle in which the conductive particles each having a particle size smaller than a particle size of an intermediate particle are attached to the intermediate particle and which is disposed on the disposition part, to reciprocate between the disposition part and the adsorption part, and to cause the conductive particles to be adsorbed onto the adsorption part.

The method can include a step of disposing a blend particle in which conductive particles each having a particle size smaller than a particle size of an intermediate particle are attached to the intermediate particle, on a disposition part of an electrostatic adsorption device including a first electrode including the disposition part having electrostatic diffusivity or conductivity on which particles are disposed and a second electrode including an adsorption part having electrostatic diffusivity or conductivity and facing the disposition part (hereinafter, also referred to as a first step); and a step of forming an electric field between the first electrode and the second electrode to cause the blend particle to reciprocate between the disposition part and the adsorption part and to cause the conductive particles to be adsorbed onto the adsorption part (hereinafter, also referred to as a second step).

A surface resistivity of each of the disposition part having electrostatic diffusivity and the adsorption part having electrostatic diffusivity may be $10^{13}\Omega$ or less or $10^6$ $\Omega$ or more. A surface resistivity of each of the disposition part having conductivity and the adsorption part having conductivity may be $10^6$ $\Omega$ or less or $10^{-3}\Omega$ or more.

FIG. 1 is a view showing a schematic configuration of an electrostatic adsorption device used in a method for dispersing conductive particles according to the present embodiment. An electrostatic adsorption device 1 includes a lower electrode (first electrode) 4 including a disposition part 2 on which particles are to be disposed; an upper electrode (second electrode) 7 including an adsorption part 5 disposed above the disposition part 2 in a gravity direction to face the disposition part 2; a power supply 8 connected to the lower electrode 4 and to the upper electrode 7; and a control unit 9 connected to the power supply 8.

In the electrostatic adsorption device 1, the lower electrode 4 includes an electrode main body 3 and the disposition part 2, and the upper electrode 7 includes an electrode main body 6 and the adsorption part 5. The lower electrode may be such that the electrode main body and the disposition part are integrated, and the upper electrode may be such that the electrode main body and the adsorption part are integrated. In this case, a surface of the lower electrode facing the upper electrode can serve as the disposition part, and a surface of the upper electrode facing the lower electrode can serve as the adsorption part.

A material having electrostatic diffusivity or conductivity can be used as the material of the electrode main body 3 forming the lower electrode 4. For example, a material having a surface resistivity of $10^{13}$ $\Omega$ or less can be used, and specific examples of the material include metal, glass, and the like. The shape of the electrode main body 3 is not particularly limited and may be, for example, a flat plate shape, a roll shape, or the like.

A material having electrostatic diffusivity or conductivity can be used as the material of the disposition part 2. For example, a material having a surface resistivity of $10^{13}\Omega$ or less, and specific examples of the material include metal, glass, a conductive resin such as conductive polytetrafluoroethylene (PTFE), and the like. The shape of the disposition part 2 is not particularly limited as long as particles can be disposed thereon, and may be a membrane or a film formed on a surface of the electrode main body 3 or a shape capable of accommodating particles, for example, a shape that has a bottom surface and a side surface and that is open in an adsorption part direction. The disposition part shown in FIG. 1 can accommodate more particles.

For example, a lower electrode made of a material having a surface resistivity of $10^{13}\Omega$ or less such as metal or glass can be used as the lower electrode in which the electrode main body and the disposition part are integrated.

A material having electrostatic diffusivity or conductivity can be used as the material of the electrode main body 6 forming the upper electrode 7. For example, a material having a surface resistivity of $10^{13}\Omega$ or less can be used, and specific examples of the material include metal, glass, and the like. The shape of the electrode main body 6 is not particularly limited and may be, for example, a flat plate shape, a roll shape, or the like.

A material having electrostatic diffusivity or conductivity can be used as the material of the adsorption part 5. For example, a material having a surface resistivity of $10^{13}\Omega$ or less, and specific examples of the material include metal, glass, a conductive resin such as conductive PTFE, and the like. The shape of the adsorption part 5 is not particularly limited and may be a membrane or a film formed on a surface of the electrode main body 6.

For example, an upper electrode made of a material having a surface resistivity of $10^{13}\Omega$ or less such as metal or glass can be used as the upper electrode in which the electrode main body and the adsorption part are integrated.

The adsorption part 5 may be provided with an opening pattern (plurality of opening portions) that is open toward a disposition part side. The shape of the adsorption part 5 may be a membrane or a film formed on the surface of the electrode main body 6, or a film separable from the electrode main body 6.

Figure 2:
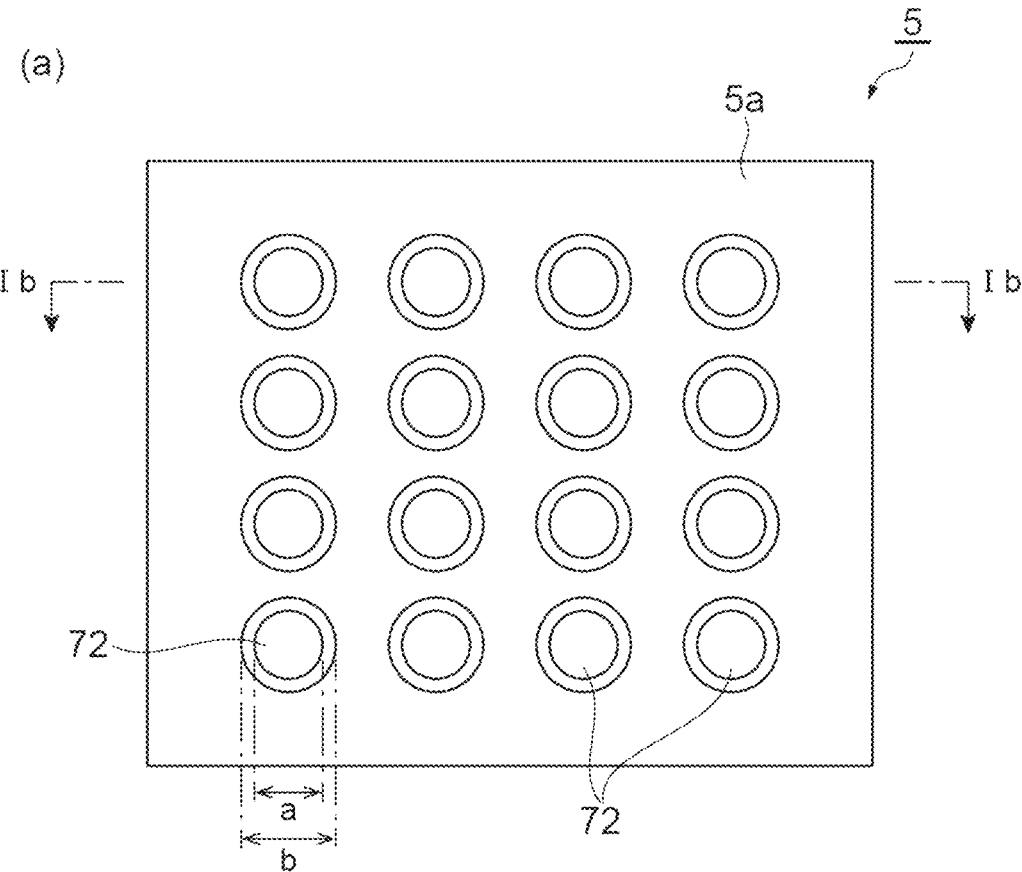
FIG. 2(a) is a plan view schematically showing one example of an adsorption part.
FIG. 2(b) is a cross-sectional view taken along line Ib-Ib of FIG. 2(a).
Figure 2:
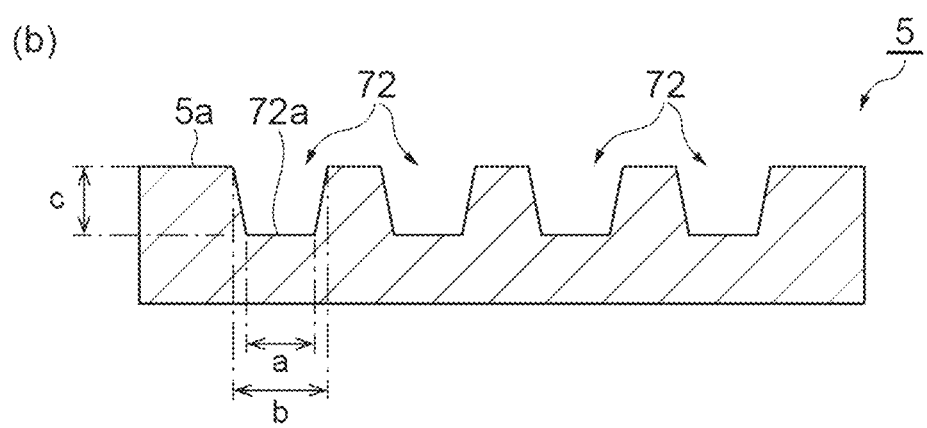

FIG. 2(a) is a plan view schematically showing one example of the adsorption part, and FIG. 2(b) is a cross-sectional view taken along line Ib-Ib of FIG. 2(a). The adsorption part 5 shown in FIG. 2(a) is provided with a plurality of opening portions (recesses) 72 having a predetermined pattern (opening pattern). The predetermined pattern (opening pattern) may be a regular disposition.

It is preferable that the opening portion 72 of the adsorption part 5 is formed in a tapered shape in which the opening area is increased from a bottom portion 72a side of the opening portion 72 toward a surface 5a side of the adsorption part 5. Namely, as shown in FIGS. 2(a) and 2(b), it is preferable that a width of the bottom portion 72a of the opening portion 72 (width a in FIGS. 2(a) and 2(b)) is narrower than a width of an opening in the surface 5a of the opening portion 72 (width b in FIGS. 2(a) and 2(b)). Then, the size of the opening portion 72 (the width a, the width b, a taper angle, a depth, and the like) may be set according to the size of a conductive particles to be accommodated.

For example, the width b of the opening can be set to 1.0 to 1.5 times or 1.05 to 1.45 times a particle size of the conductive particles. In addition, the particle size of the intermediate particle can be set to 2.0 to 110 times or 2.5 to 100 times the width b of the opening.

Incidentally, the shape of the opening portion 72 may be a shape other than the shape shown in FIGS. 2(a) and 2(b).

For example, the shape of the opening in the surface 5a may be an elliptical shape, a triangular shape, a quadrilateral shape, a polygonal shape, or the like other than a circular shape shown in FIG. 2(a). The bottom portion 72a may also have a shape other than a flat surface and have, for example, a mountain shape, a valley shape, an aggregate of very small projections, or the like.

Figure 3:
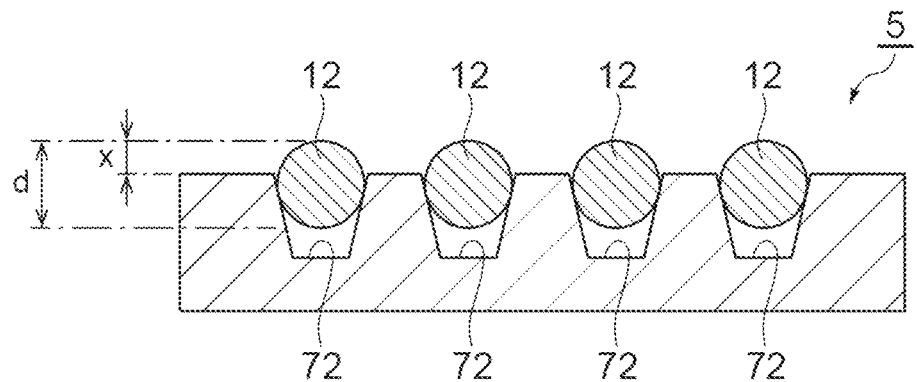
FIG. 3 is a cross-sectional view schematically showing a state where the conductive particles are accommodated in opening portions of the adsorption part.

FIG. 3 is a cross-sectional view schematically showing a state where the conductive particles are accommodated in the opening portions of the adsorption part. From the viewpoint of facilitating removing particles (surplus particles) other than conductive particles accommodated in the opening portions and transferring the accommodated conductive particles onto an adhesive base material or the like, the shape of the opening portion 72 can be set such that a distance X between a vertex of the conductive particle accommodated in the opening portion 72 and the surface 5a of the adsorption part is −20 to 80% of a particle size d of the conductive particle, preferably −15 to 60%, the vertex being opposite to the adsorption part. Incidentally, as shown in FIG. 3, a case where X is a positive value means a state where the conductive particle protrudes from the surface 5a of the adsorption part, and a case where X is a negative value means a state where the conductive particle does not protrude from the surface 5a of the adsorption part, in other words, is buried.

For example, inorganic materials such as silicon, various ceramics, glass, metal such as stainless steel, and organic materials such as various resins can be used as a material forming the adsorption part 5. The opening portions 72 of the adsorption part can be formed by a known method such as a photolithography method or nanoimprinting. In addition, the adsorption part 5 may be formed of a single layer or a plurality of layers such as a laminate including a substrate layer and an opening portion layer provided with opening portions. When the adsorption part 5 is a laminate, the adsorption part 5 may be, for example, a film including an opening portion layer that is formed on a substrate layer of PET or the like using a photocurable resin composition by a method such as a photolithography method or nanoimprinting. The electrostatic diffusivity or the conductivity of the adsorption part can be adjusted by the type of a forming material, a surface treatment, or the like.

Figure 4:
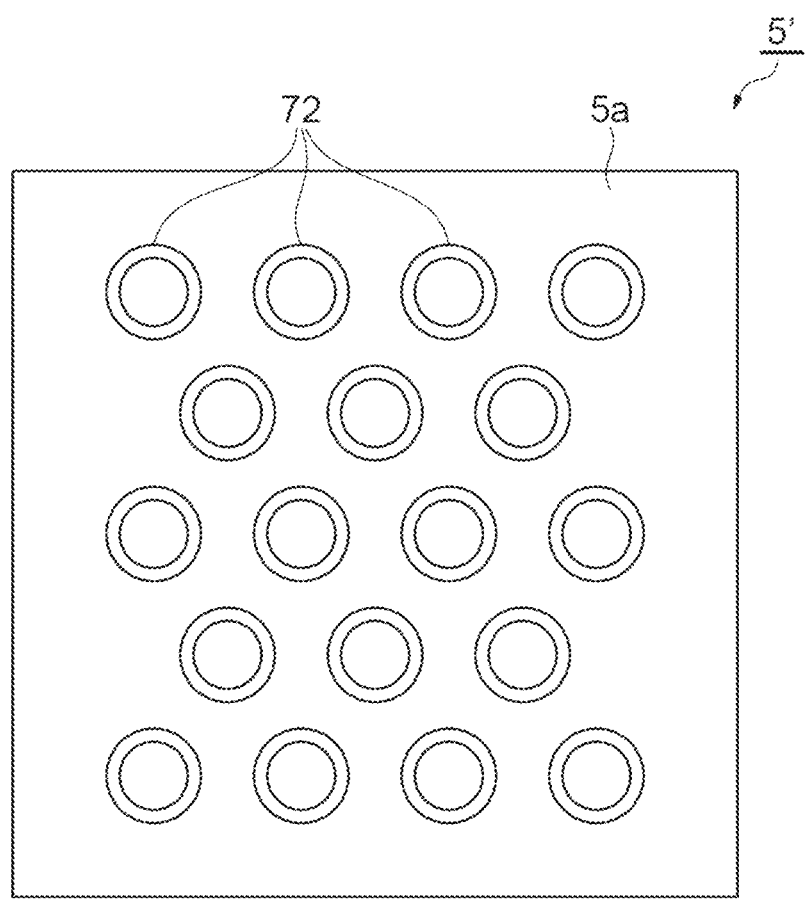
FIG. 4 is a plan view schematically showing one example of another opening pattern of the adsorption part.

The opening pattern can be appropriately set such that the conductive particles can be dispersed in a desired disposition. In the adsorption part 5 shown in FIG. 2(a), the opening portions of round holes are provided in series in a grid pattern but, for example, can be staggered at 60° as shown in FIG. 4. In addition, the opening pattern may be such that the opening portions are provided in an aligned manner or randomly.

In the electrostatic adsorption device 1, the lower electrode 4 and the upper electrode 7 are disposed at a predetermined interval, and the electrode-to-electrode distance can be set to 0.5 to 100 mm or may be 1 to 20 mm or 2 to 15 mm.

In the electrostatic adsorption device 1, the lower electrode 4 may be movable, and in this case, it is easy to continuously supply the blend particles. For example, the lower electrode can be provided on a surface of a belt or a columnar roller.

In the electrostatic adsorption device 1, the upper electrode 7 may be movable, and in this case, it is easy to continuously supply the adsorption part that adsorbs the conductive particles. For example, the upper electrode can be provided on a surface of a belt or a columnar roller.

The power supply 8 may be any type as long as it is capable of forming an electric field between the lower electrode and the upper electrode, and for example, a known high-voltage power supply can be used. The high-voltage power supply may be a DC power supply or an AC power supply.

The control unit 9 can have, for example, a function of adjusting an applied voltage, an application time, and the like.

<First Step>

Figure 5:
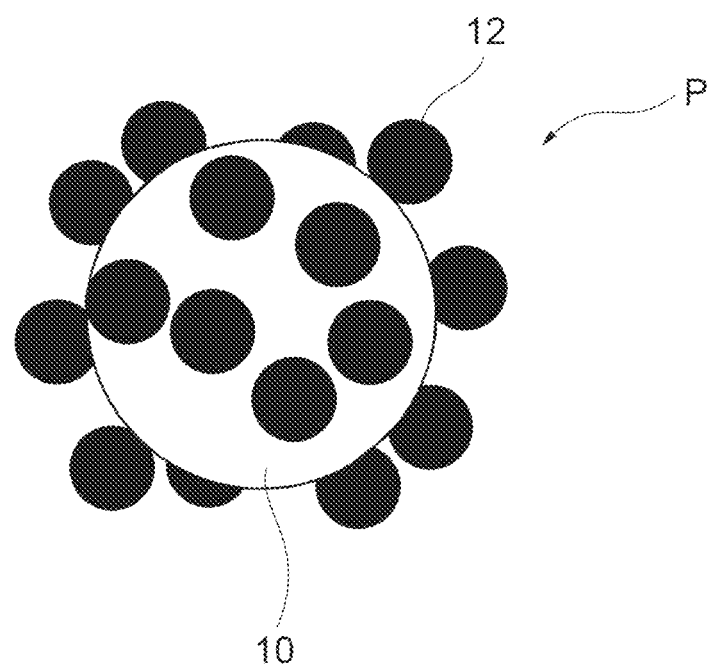
FIG. 5 is a schematic view showing a blend particle used in the method for dispersing conductive particles according to one embodiment of the present invention.

In a first step, the blend particle in which the conductive particles each having a particle size smaller than that of the intermediate particle are attached to the intermediate particle are disposed (accommodated) on the disposition part 2 of the electrostatic adsorption device 1 described above. FIG. 5 is a schematic view showing the blend particle. As shown in FIG. 5, a blend particle P includes an intermediate particle 10 and conductive particles 12 attached to a surface of the intermediate particle 10.

The intermediate particle 10 may be a particle having electrostatic diffusivity or conductivity, and a particle containing a material having a surface resistivity of $10^{13} \Omega$ or less can be used. For example, a carbon particle, a metal particle such as solder, a glass particle, and an inorganic particle having electrostatic diffusivity can be used. The above particles can be used alone or in combination of two or more types.

The intermediate particle 10 may be spherical or substantially spherical, or recesses, protrusions, or recesses and protrusions may be provided on a surface of the intermediate particle 10.

From the viewpoint of facilitating the movement of the blend particles while suppressing the agglomeration of the blend particles, the particle size of the intermediate particle 10 may be 30 to 500 pin, 40 to 400 μm, or 50 to 300 μm.

In the present embodiment, intermediate particles having an average particle size within the above ranges may be used. Incidentally, an average particle size of particles in the present specification is obtained by measuring particle sizes of 100 particles via observation using a scanning electron microscope (SEM) and by taking an average value of the measured particle sizes. Incidentally, when the particle is not spherical, such as including projections, the particle size of the particle is a diameter of a circle circumscribing the particle in a SEM image.

In addition, the intermediate particle 10 may be selected by a method in which when the intermediate particle 10 is disposed on the disposition part of the electrostatic adsorption device and an electric field is applied under predetermined conditions to be described later, which is performed in a second step, it is confirmed that the intermediate particle 10 reciprocates between the lower electrode (first electrode) and the upper electrode (second electrode).

The conductive particle 12 may contain a material having conductivity and function as a conductive material, and examples of the conductive particle 12 include metal particles of gold, silver, nickel, copper, and solder, a carbon particle, conductive material-coated particles obtained by coating non-conductive particles of glass, ceramic, and plastic with a conductive substance such as metal, and the like. Examples of the metal with which the non-conductive particle is coated include gold, silver, nickel, copper, solder, and the like, and the metal may have a multilayer structure. In addition, the conductive particle may be such that an insulating coating (for example, insulating fine particles or the like) exists on at least a part of an outer surface of the conductive particle.

The conductive particles can be used alone or in combination of two or more types.

The conductive particle 12 may be spherical or substantially spherical, and may be a composite particle including a conductive particle and a plurality of fine particles provided on at least a part of an outer surface of the conductive particle.

The particle size of the conductive particle 12 may be 1 to 40 μm, 1.5 to 30 μm, or 2 to 20 μm.

In the present embodiment, conductive particles having an average particle size within the above ranges may be used.

From the viewpoint of causing the conductive particles to be efficiently adsorbed onto adsorption part, the particle size of the intermediate particle forming the blend particle P may be 5 to 200 times, 10 to 150 times, or 10 to 100 times the particle size of the conductive particles.

The blend particles P can be prepared by mixing the intermediate particles and the conductive particles. The mixing method is not particularly limited, and for example, known mixing means such as a stirrer may be used or a container in which the intermediate particles and the conductive particles are put may be shaken. It is preferable that mixing is performed without causing damage to the particles.

The blending ratio of the intermediate particle and the conductive particle can be appropriately set such that a sufficient amount of the conductive particles are attached to a surface of the intermediate particle. Incidentally, when the blending amount of the conductive particles is too large, since the agglomeration of the conductive particles is likely to occur, it is preferable that the blending ratio is set within a range where the agglomeration of the conductive particles can be suppressed.

<Second Step>

In the second step, an electric field is formed between the first electrode and the second electrode to cause the blend particles to reciprocate between the disposition part and the adsorption part and to cause the conductive particles to be adsorbed onto the adsorption part.

Figure 6:
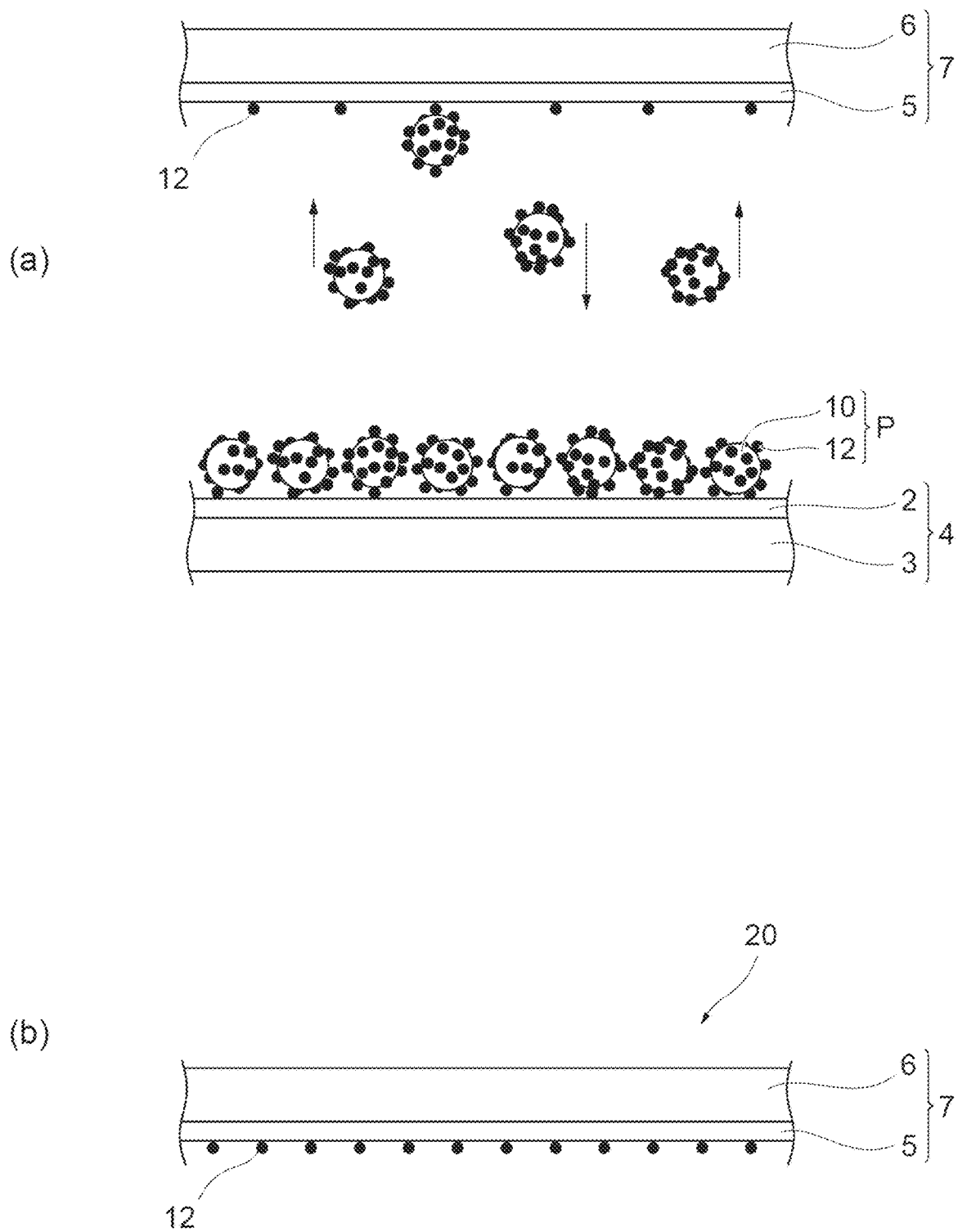
FIG. 6 provides schematic views for describing the method for dispersing conductive particles according to one embodiment of the present invention.

FIG. 6 provides views for describing the second step, and FIG. 6(*a*) shows the reciprocation (up and down movement) of the blend particles when an electric field is applied between the lower electrode (first electrode) and the upper electrode (second electrode). The blend particles on the disposition part which are charged with the polarity opposite to that of the upper electrode ascend because of an electrostatic attractive force. The ascended blend particles come into contact with the adsorption part. At this time, the conductive particles having a small particle size which are attached to the surface of the intermediate particle having a large particle size are adsorbed onto the adsorption part. The blend particles that have come into contact with the adsorption part are charged with the same polarity as that of the upper electrode and descend because of an electrostatic repulsive force and gravity in the present embodiment. The descended blend particles are charged on the disposition part to have the polarity opposite to that of the upper electrode and ascend because of an electrostatic attractive force. The conductive particles are adsorbed onto the adsorption part by the repetition of the above process. In addition, since the conductive particles are attached to the surface of the intermediate particle, the agglomeration of the conductive particles can be suppressed, and the conductive particles adsorbed onto the adsorption part are disposed to be separated from each other. In such a manner, as shown in FIG. 6(*b*), the upper electrode 7 in which the conductive particles 12 are adsorbed onto the adsorption part 5, namely, an electrode 20 with conductive particles is obtained.

The intensity of the applied electric field can be set to 0.1 to 30 kV/cm or may be 0.5 to 30 kV/cm or 1 to 20 kV/cm.

The application of the electric field may be continuous or intermittent.

The application time of the electric field can be appropriately set according to the amount of the conductive particles adsorbed onto the adsorption part.

The electrode 20 with conductive particles obtained through the second step may be used as a base material as it is, in which the conductive particles are two-dimensionally disposed to be separated from each other, or may be used to move the conductive particles onto a predetermined base material.

Figure 7:
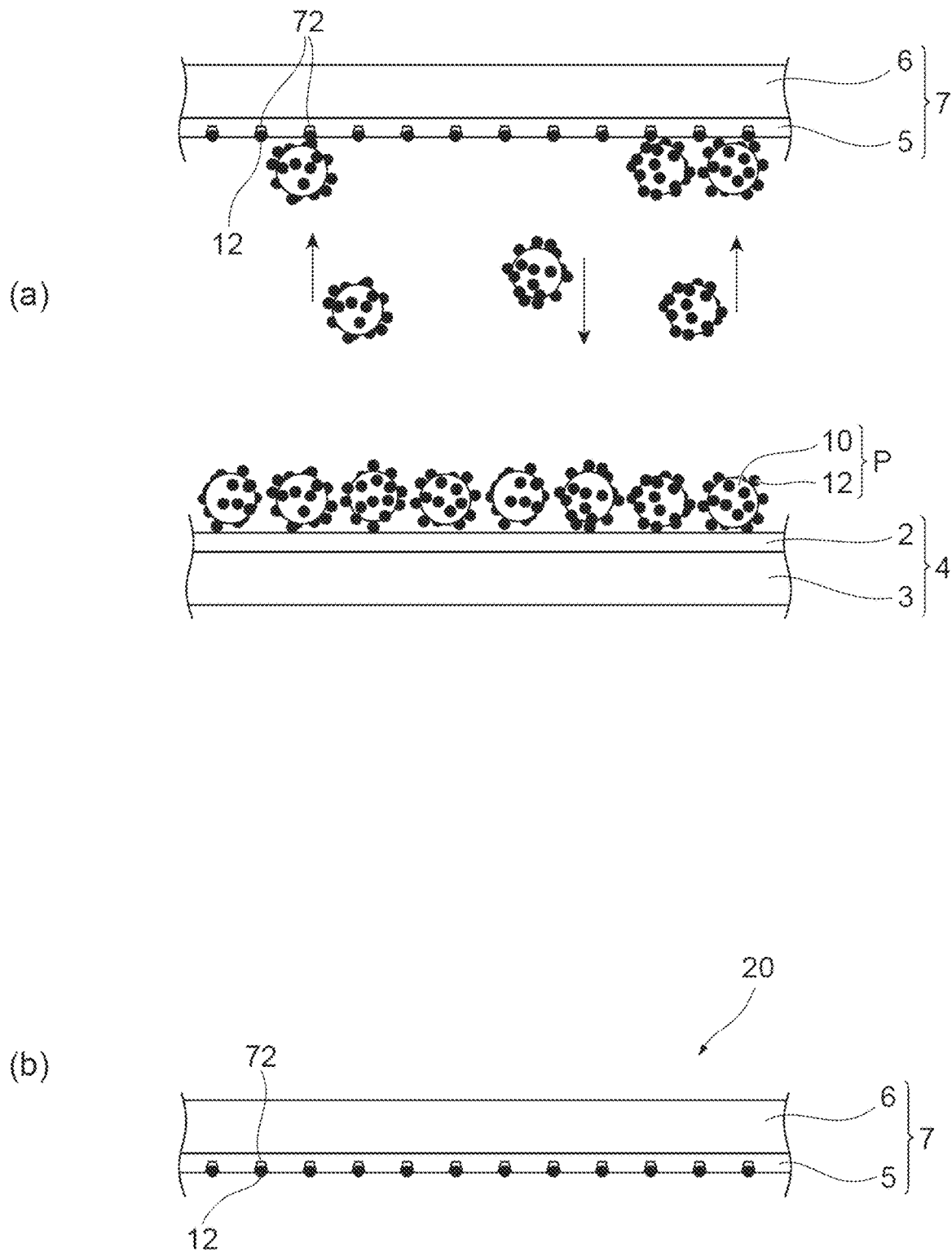
FIG. 7 provides schematic views for describing another embodiment of a method for dispersing conductive particles.

FIG. 7 provides views showing the second step when the adsorption part 5 has an opening pattern. In this case, as shown in FIG. 7(b), the upper electrode 7 in which the conductive particles 12 are accommodated in the opening portions 72 of the adsorption part 5, namely, the electrode 20 with conductive particles is obtained by performing the second step in the same manner as described above.

A dispersion method according to the present embodiment when the adsorption part 5 has an opening pattern may further include a step of removing particles (surplus particles) other than the conductive particles attached to the adsorption part and accommodated in the opening portions (hereinafter, also referred to as a surplus particle removal step). The surplus particle removal step can be performed before the conductive particles accommodated in the opening portions are transferred onto a predetermined adhesive base material. In this case, the particles removed from the adsorption part may be recovered and recycled, and it is preferable that at least the conductive particles among the surplus particles are recovered and recycled.

Examples of a method for removing the surplus particles include physically removal means such as an air blower, a brush, and a squeegee and electrostatically removal means such as an ionizer.

The method for dispersing conductive particles according to the present embodiment can further include a step of causing the conductive particles adsorbed onto the adsorption part, to be electrostatically adsorbed onto a second adsorption part having an insulating property and being disposed to face the adsorption part (hereinafter, also referred to as a third step).

<Third Step>

Figure 8:
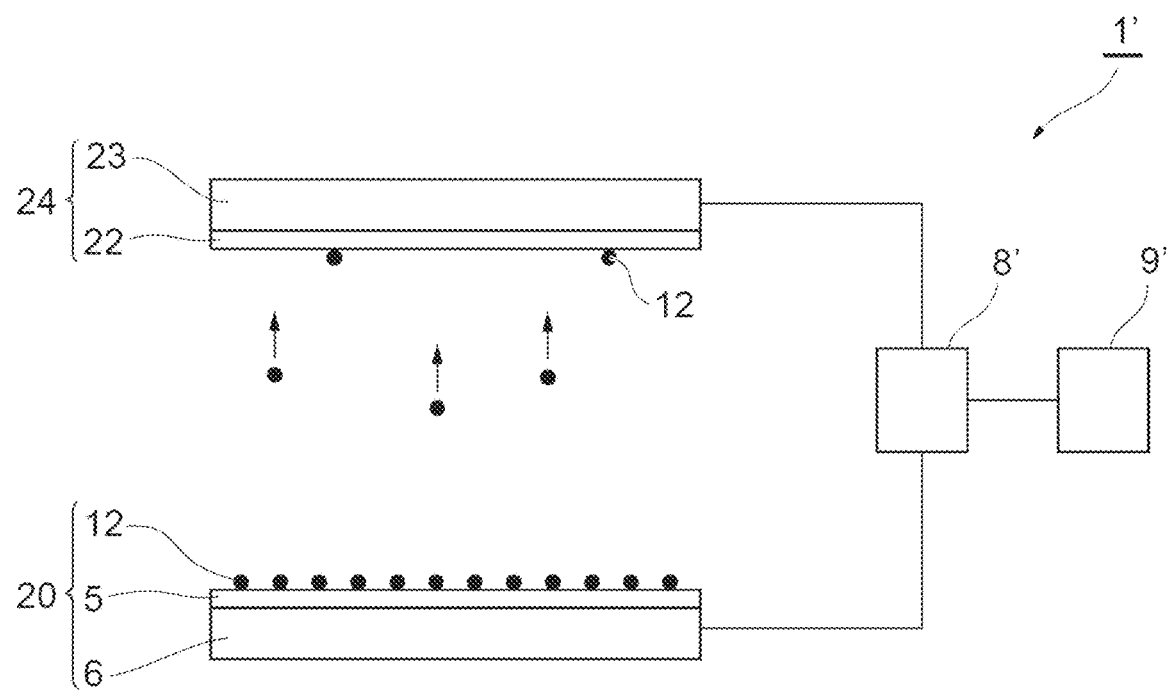
FIG. 8 is a schematic view for describing a method for dispersing conductive particles according to one embodiment of the present invention.

FIG. 8 is a view for describing the third step, and an electrostatic adsorption device 1' shown in FIG. 8 has the same configuration as that of the electrostatic adsorption device 1, except that the electrode 20 with conductive particles obtained through the second step is used instead of the lower electrode 4 in the electrostatic adsorption device 1 and a third electrode 24 including a second adsorption part 22 having an insulating property and being disposed to face the adsorption part 5 of the electrode 20 with conductive particles is used instead of the upper electrode 7. Incidentally, reference signs 8' and 9' in FIG. 8 represent a power supply and a control unit, respectively.

The third electrode 24 includes an electrode main body 23 and the second adsorption part 22.

A material having electrostatic diffusivity or conductivity can be used as the material of the electrode main body 23 forming the third electrode 24. For example, a material having a surface resistivity of $10^{13}\Omega$ or less can be used, and specific examples of the material include metal, glass, and the like. The shape of the electrode main body 23 is not particularly limited and may be, for example, a flat plate shape, a roll shape, or the like.

An insulating material can be used as the material of the second adsorption part 22. For example, a material having a surface resistivity of more than $10^{13}\Omega$, and specific examples of the material include resin such as polytetrafluoroethylene. The shape of the second adsorption part 22 is not particularly limited and may be a membrane or a film formed on a surface of the electrode main body 23 or a film separable from the electrode main body 23.

When an electric field is formed between the electrode 20 with conductive particles and the third electrode 24 of the electrostatic adsorption device 1', the conductive particles of the electrode 20 with conductive particles are charged with the polarity opposite to that of the third electrode 24, ascend because of an electrostatic attractive force, and are adsorbed onto the adsorption part 22 that is the second adsorption part. Accordingly, the adsorption part 22 is obtained onto which the conductive particles 12 are adsorbed.

Since the third step is provided, it is easy to adjust the particle density and make intervals between the conductive particles more uniform.

In addition, because of the action of reduction of the electric field caused by the adsorption of the conductive particles onto the second adsorption part having an insulating property, the electrostatic adsorption of the conductive particles can be stopped when a predetermined amount of the conductive particles are adsorbed onto the second adsorption part, and the above effects are easily obtained. Namely, since the more the conductive particles are attached to the second adsorption part, the smaller the intensity of the electrode-to-electrode electric field between the electrode 20 with conductive particles and the third electrode 24 is, in addition to the conductive particles being removed from the surface of the electrode with conductive particles, the electrode-to-electrode electric field is sufficiently decreased, so that the flight of the conductive particles can be stopped. When this phenomenon is used and, for example, the movement of the electrode with conductive particles is allowed to supply a sufficient amount of the conductive particles, it is possible to cause the conductive particles to be adsorbed onto the adsorption part of the third electrode until the electric field is sufficiently weakened. At this time, all the conductive particles are considered to be charged with the same polarity, and even when the conductive particles fly to the same place as that of the already adsorbed conductive particles, the conductive particles are movable to avoid collision because of an electrostatic repulsive force, and can be adsorbed onto a location where the conductive particles are not adsorbed. Consequently, since the third step is provided, it is possible to anticipate, particularly, setting the intervals between the particles to a substantially equal interval while causing a sufficient number of the conductive particles to be attached to the adsorption part, namely, achieving both the conductive particle density and uniform dispersion at a high level.

The second adsorption part 22 may be provided with an opening pattern (plurality of opening portions) that is open toward a disposition part side. The shape of the adsorption part 22 may be a membrane or a film formed on the surface of the electrode main body 23, or a film separable from the electrode main body 23.

The second adsorption part 22 having an opening pattern can be provided similarly to the adsorption part 5 having an opening pattern described above, except for having an insulating property.

In addition, the above-described surplus particle removal step can be performed.

The third electrode 24 in the electrostatic adsorption device 1' may be movable, and in this case, it is easy to continuously supply the adsorption part that adsorbs the conductive particles. For example, the third electrode can be provided on a surface of a belt or a columnar roller. In addition, the third electrode may be a film to which the second adsorption part is continuously supplied.

In the above-described electrostatic adsorption devices, the first electrode and the second electrode, and the electrode with conductive particles and the third electrode are disposed on a lower side and an upper side with respect to the gravity direction, respectively, but in the method for dispersing conductive particles according to the present embodiment, a moving direction of the blend particle or the conductive particle may be horizontal or inclined with respect to the gravity direction. Even in these cases, each of the first electrode, the second electrode, and the third electrode can have the same configuration as described above. Further, the first step, the second step, and the third step may be continuously performed.

According to the method for dispersing conductive particles in the present embodiment, since the conductive particles can be two-dimensionally disposed to be separated from each other, the present invention can be applied to various electronic materials such as a conductive material.

[Electrostatic Adsorption Device]

The electrostatic adsorption device of the present embodiment includes the first electrode including the disposition part having electrostatic diffusivity or conductivity on which the particles are disposed, and the second electrode including the adsorption part having an insulating property which faces the disposition part and which is provided with the opening pattern that is open toward the disposition part side.

The electrostatic adsorption device of the present embodiment can have the same configuration as that of an electrostatic adsorption device that is used in the method for dispersing conductive particles described above.

EXAMPLES

Hereinafter, the present invention will be further specifically described with reference to examples and comparative examples, but the present invention is not limited to the following examples.

[Preparation of Blend Particle]

Preparation Example 1

Blend particles 1 were obtained by putting 60 parts by mass of carbon particles (product name "NICA beads ICB-15020" manufactured by Nippon Carbon Co., Ltd.) having an average particle size of 150 μm as intermediate particles and 1 part by mass of conductive material-coated particles having an average particle size of 3 μm as conductive particles where were obtained by applying Ni plating to surfaces of plastic core particles, in a container of glass, and by mixing the particles through shaking the container. Incidentally, the obtained blend particles 1 were observed with a scanning electron microscope to confirm that the conductive particles were attached to surfaces of the intermediate particles.

Preparation Example 2

Blend particles 2 were obtained by putting 60 parts by mass of solder particles (product name "ECO SOLDER BALL" manufactured by Senju Metal Industry Co., Ltd.) having an average particle size of 300 μm as intermediate particles and 1 part by mass of conductive material-coated particles having an average particle size of 3 μm as a conductive particles which were obtained by applying Ni plating to surfaces of plastic core particles, in a container of glass, and by mixing the particles through shaking the container. Incidentally, the obtained blend particles 2 were observed with a scanning electron microscope to confirm that the conductive particles were attached to surfaces of the intermediate particles.

Example 1

A device having the same configuration as that of the electrostatic adsorption device 1 according to the embodiment described above was prepared, a brass plate was used as the lower electrode 4, a glass plate was used as the upper electrode 7, and the electrode-to-electrode distance was set to 6 mm.

The blend particles 1 were disposed on a surface of the brass plate (lower electrode), and a voltage of 3.3 kV was applied between the electrodes to move the blend particles up and down. Accordingly, a glass plate with conductive particles in which the conductive particles were adsorbed onto a surface of the glass plate to be separated from each other was obtained.

Figure 9:
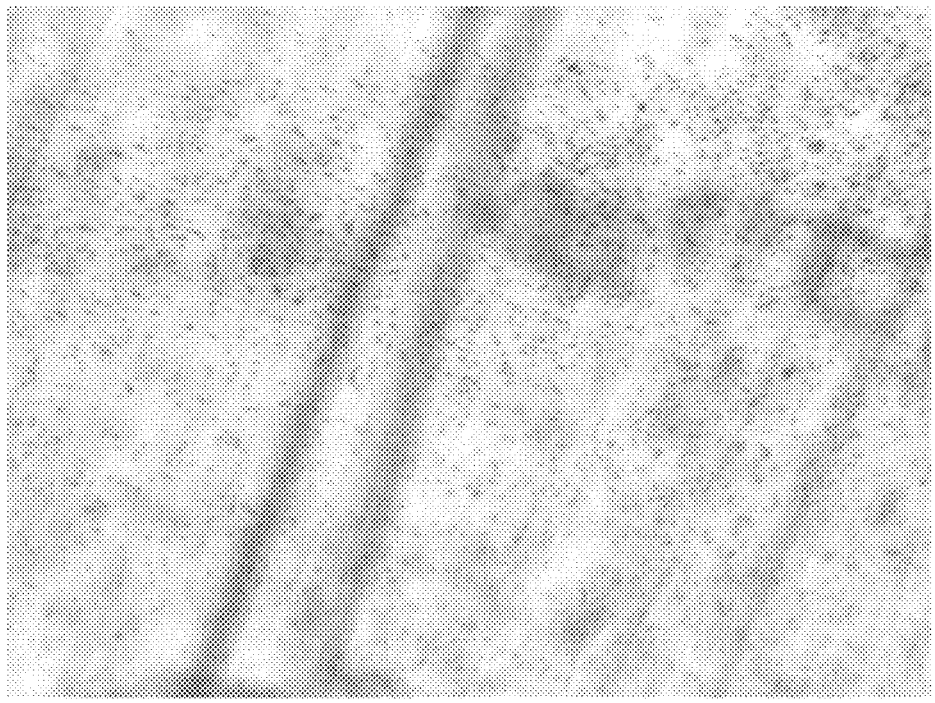
FIG. 9 provides enlarged pictures of an adsorption electrode obtained in Example 1.
Figure 9:
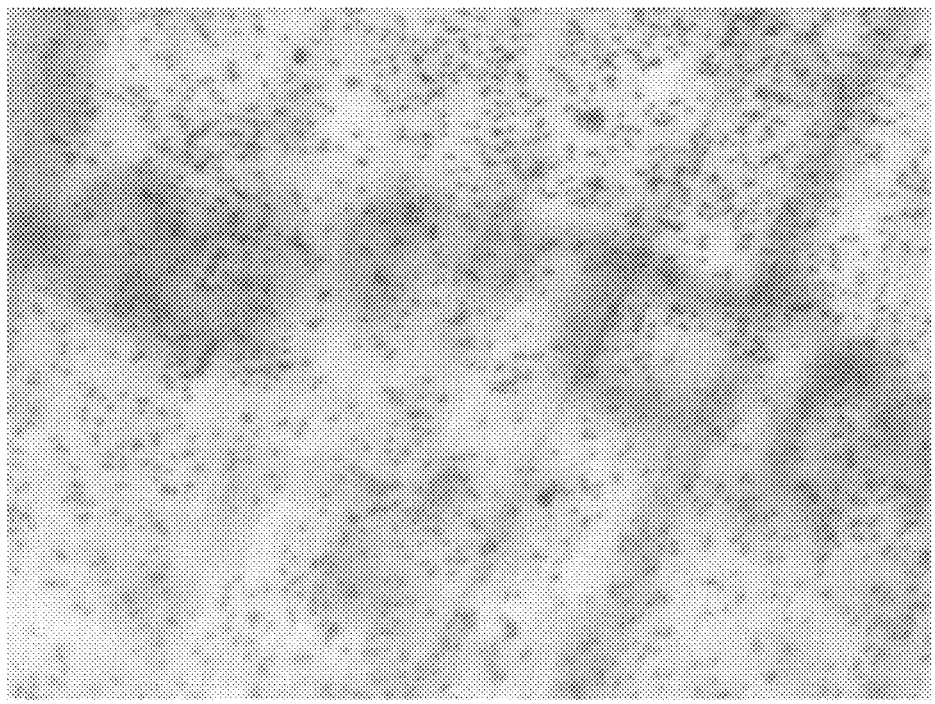

Next, a device having the same configuration as that of the electrostatic adsorption device 1' was prepared, the glass plate with conductive particles obtained above was used as the lower electrode 4, a brass plate in which one main surface was coated with polytetrafluoroethylene resin was used as the third electrode 24, and the electrode-to-electrode distance was set to 2 mm. A voltage of 6 kV was applied between the electrodes to cause the conductive particles to be electrostatically adsorbed onto an adsorption part made of polytetrafluoroethylene resin. FIG. 9 shows enlarged pictures of the adsorption part to which the conductive particles are attached. FIG. 9(a) shows a picture at a microscope magnification of 300 times, and FIG. 9(b) shows a picture at a microscope magnification of 500 times.

Example 2

A device having the same configuration as that of the electrostatic adsorption device 1 was prepared, a brass plate was used as the lower electrode 4, a glass plate was used as the upper electrode 7, and the electrode-to-electrode distance was set to 6 mm.

The blend particles 2 were disposed on a surface of the brass plate (lower electrode), and a voltage of 3.5 kV was applied between the electrodes to move the blend particles up and down. Accordingly, a glass plate with conductive particles in which the conductive particles were adsorbed onto a surface of the glass plate to be separated from each other was obtained.

Figure 10:
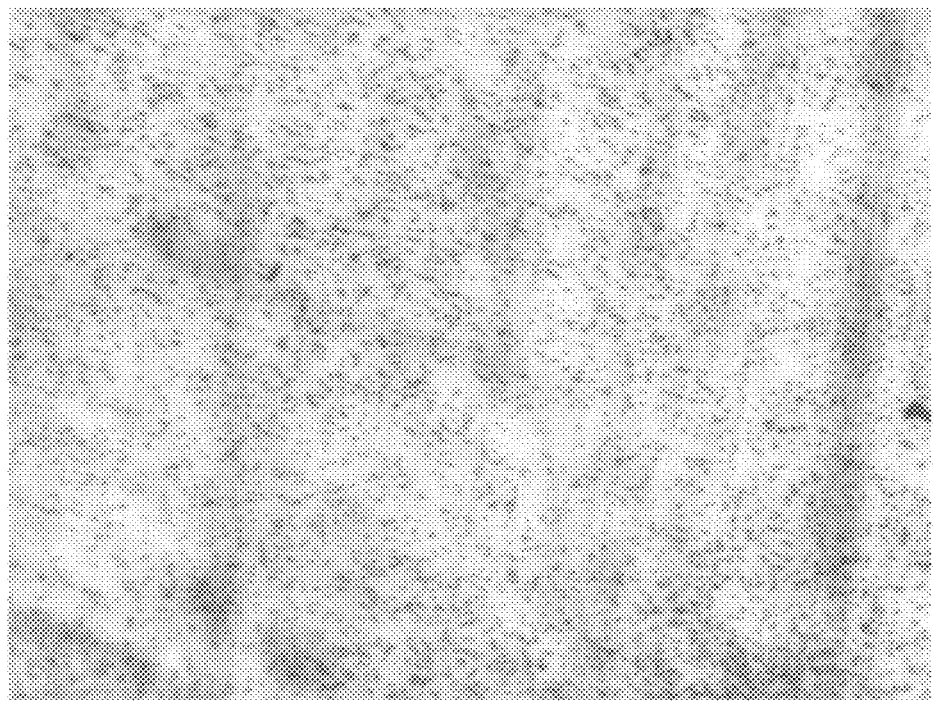
FIG. 10 provides enlarged pictures of an adsorption electrode obtained in Example 2.
Figure 10:
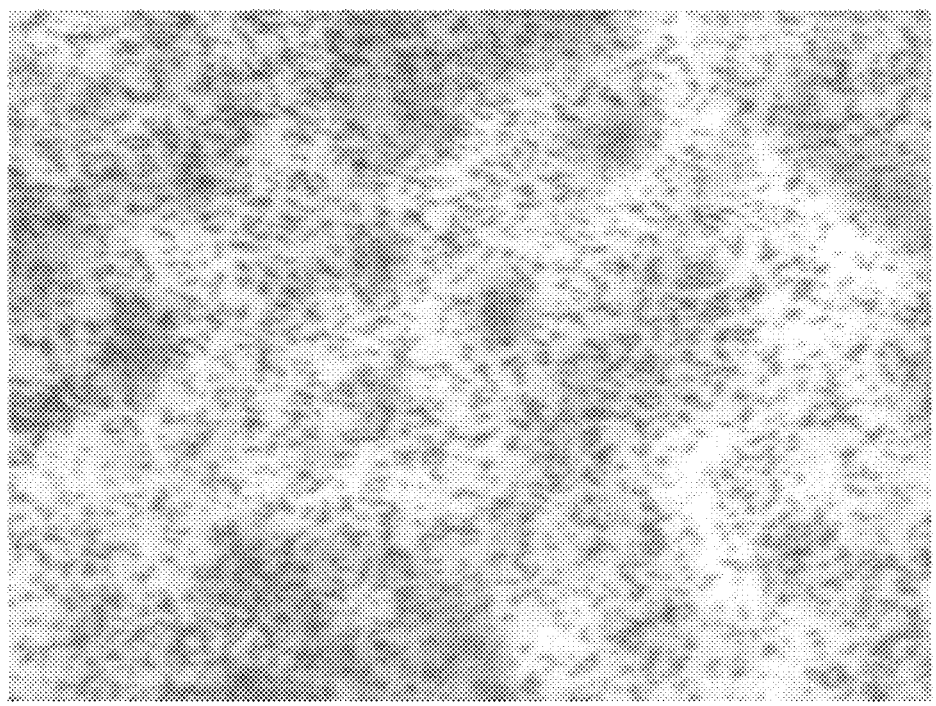

Next, a device having the same configuration as that of the electrostatic adsorption device 1' was prepared, the glass plate with conductive particles obtained above was used as the lower electrode 4, a brass plate in which one main surface was coated with polytetrafluoroethylene resin was used as the third electrode 24, and the electrode-to-electrode distance was set to 2 mm A voltage of 6 kV was applied between the electrodes to cause the conductive particles to be electrostatically adsorbed onto an adsorption part made of polytetrafluoroethylene resin. FIG. 10 shows enlarged pictures of the adsorption part to which the conductive particles are attached. FIG. 10(a) shows a picture at a microscope magnification of 300 times, and FIG. 10(b) shows a picture at a microscope magnification of 500 times.

Example 3

A device having the same configuration as that of the electrostatic adsorption device 1 was prepared, a brass plate was used as the lower electrode 4, a brass plate coated with conductive polytetrafluoroethylene was used as the upper electrode 7, and the electrode-to-electrode distance was set to 7 mm.

The blend particles 1 were disposed on a surface of the brass plate (lower electrode), and a voltage of 2.8 kV was applied between the electrodes to move the blend particles up and down. Accordingly, a brass plate with conductive particles in which the conductive particles were adsorbed onto a surface of an adsorption part of conductive polytetrafluoroethylene to be separated from each other was obtained.

Figure 11:
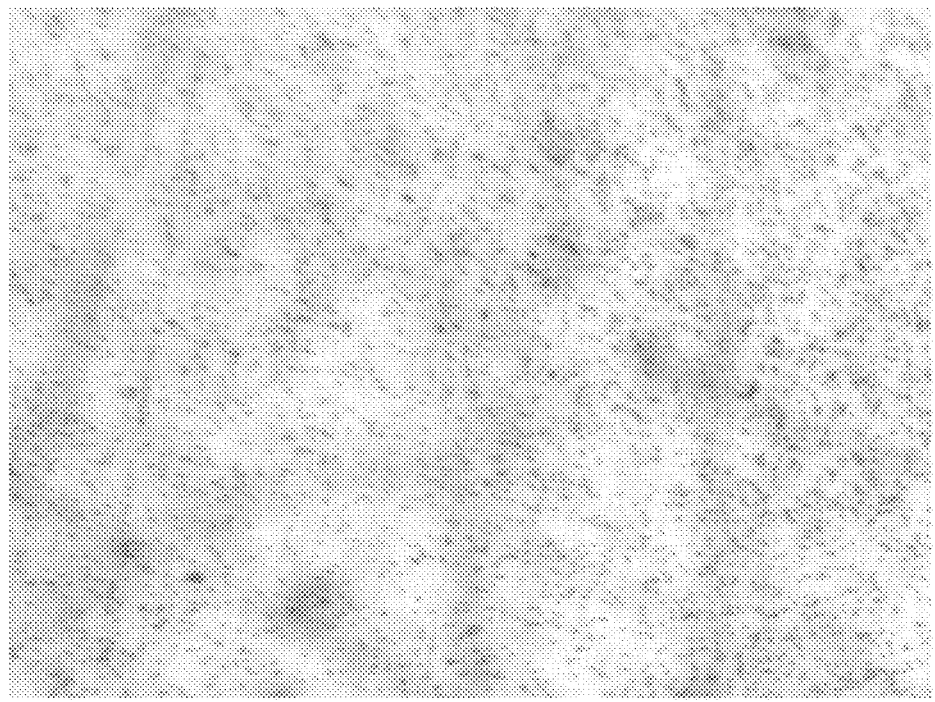
FIG. 11 provides enlarged pictures of an adsorption electrode obtained in Example 3.
Figure 11:
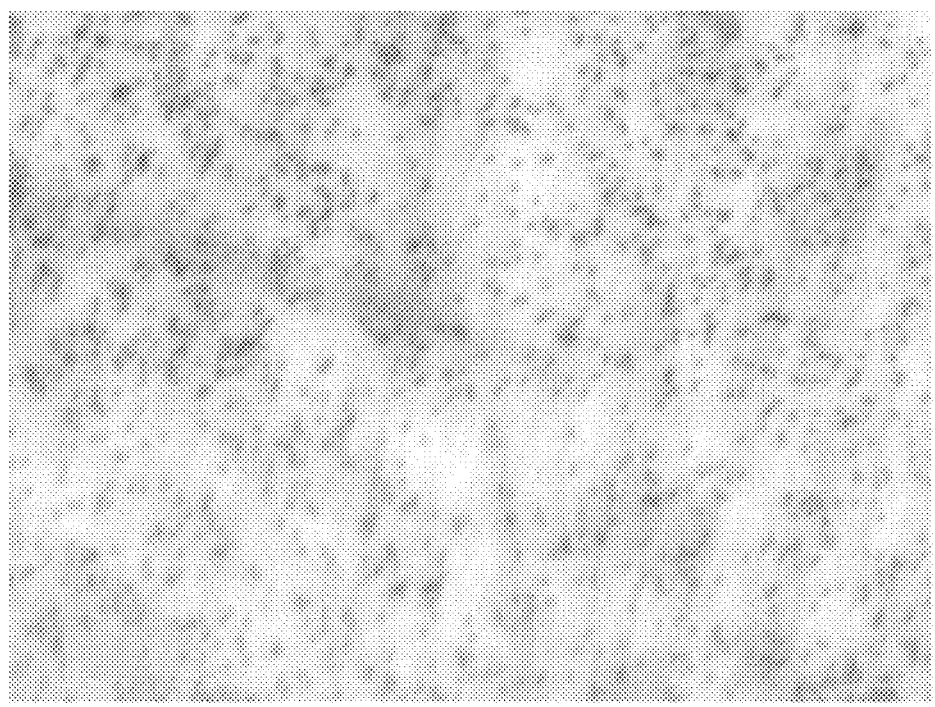

Next, a device having the same configuration as that of the electrostatic adsorption device 1' was prepared, the brass plate with conductive particles obtained above was used as the lower electrode 4, a brass plate in which one main surface was coated with polytetrafluoroethylene resin was used as the third electrode 24, and the electrode-to-electrode distance was set to 2 mm A voltage of 6 kV was applied between the electrodes to cause the conductive particles to be electrostatically adsorbed onto an adsorption part of polytetrafluoroethylene resin. FIG. 11 shows enlarged pictures of the adsorption part to which the conductive particles are attached. FIG. 11(a) shows a picture at a microscope magnification of 300 times, and FIG. 11(b) shows a picture at a microscope magnification of 500 times.

Example 4

A device having the same configuration as that of the electrostatic adsorption device 1 was prepared, a brass plate was used as the lower electrode 4, a brass plate coated with conductive polytetrafluoroethylene was used as the upper electrode 7, and the electrode-to-electrode distance was set to 7 mm.

The blend particles 2 were disposed on a surface of the brass plate (lower electrode), and a voltage of 3.5 kV was applied between the electrodes to move the blend particles up and down. Accordingly, a brass plate with conductive particles in which the conductive particles were adsorbed onto a surface of an adsorption part of conductive polytetrafluoroethylene to be separated from each other was obtained.

Figure 12:
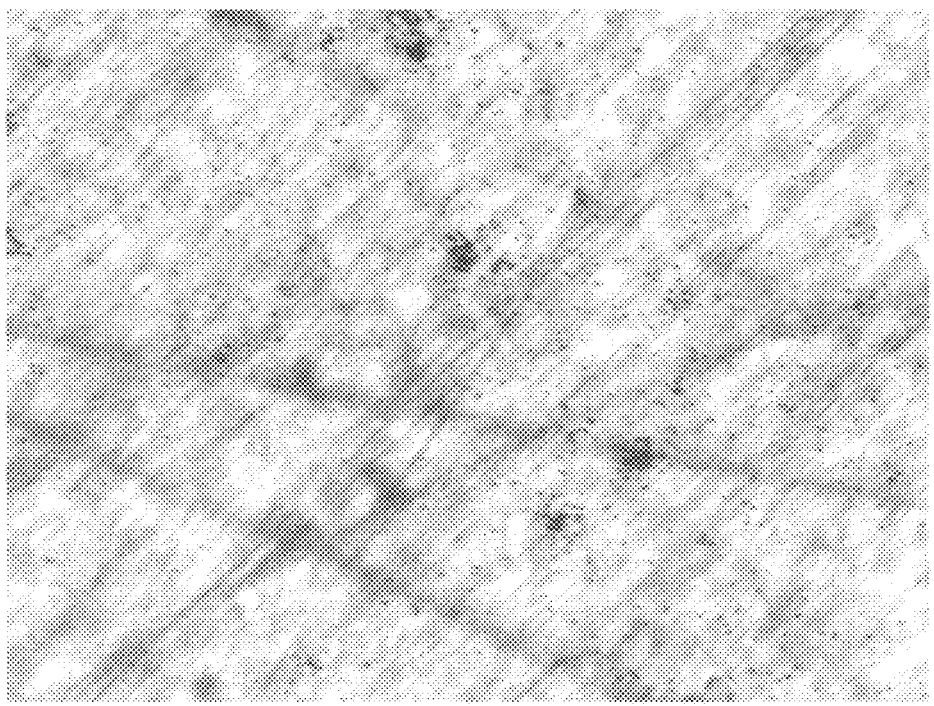
FIG. 12 provides enlarged pictures of an adsorption electrode obtained in Example 4.
Figure 12:
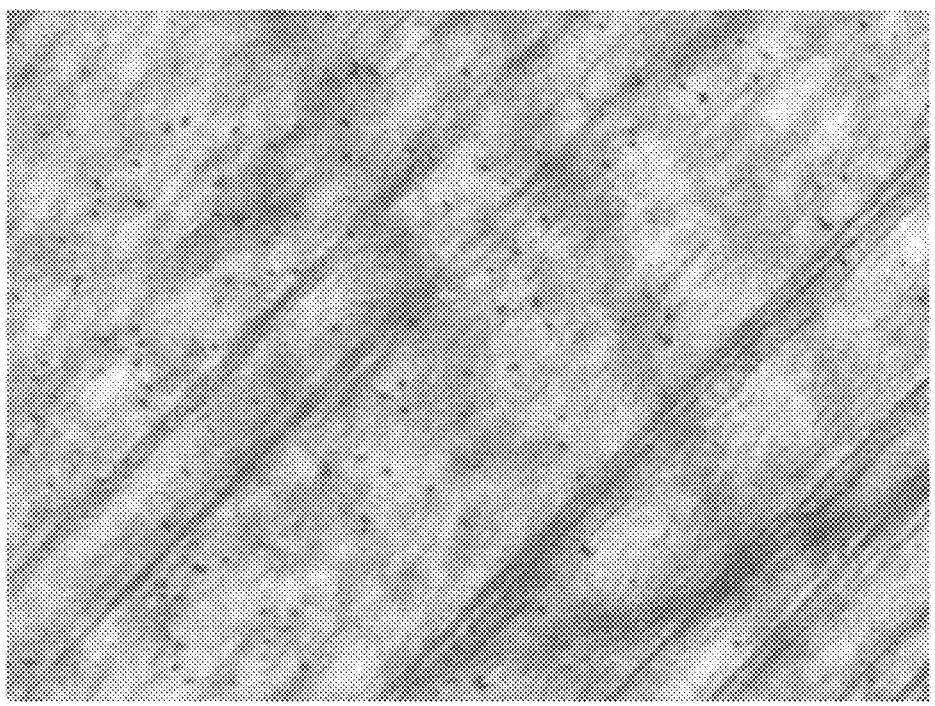

Next, a device having the same configuration as that of the electrostatic adsorption device 1' was prepared, the brass plate with conductive particles obtained above was used as the lower electrode 4, a brass plate in which one main surface was coated with polytetrafluoroethylene resin was used as the third electrode 24, and the electrode-to-electrode distance was set to 2 mm A voltage of 6 kV was applied between the electrodes to cause the conductive particles to be electrostatically adsorbed onto an adsorption part of polytetrafluoroethylene resin. FIG. 12 shows enlarged pictures of the adsorption part to which the conductive particles are attached. FIG. 12(a) shows a picture at a microscope magnification of 300 times, and FIG. 12(b) shows a picture at a microscope magnification of 500 times.

REFERENCE SIGNS LIST

1, 1': electrostatic adsorption device, 2: disposition part, 3: electrode main body, 4: lower electrode (first electrode), 5: adsorption part, 6: electrode main body, 7: upper electrode (second electrode), 8, 8': power supply, 9, 9': control unit, 10: intermediate particle, 12: conductive particle, 20: electrode with conductive particle, 22: second adsorption part, 23: electrode main body, 24: third electrode, 72: opening portion, P: blend particle.

The invention claimed is:

1. A method for preparing dispersed conductive particles, the method comprising:
    disposing preformed blend particles on a disposition part of a first electrode of an electrostatic adsorption device, wherein each of the preformed blend particles comprises a plurality of the conductive particles attached to an intermediate particle that is larger in size than the conductive particles;
    forming an electric field between the first electrode and a second electrode of the electrostatic adsorption device, the second electrode including an adsorption part facing the disposition part of the first electrode, wherein the adsorption and disposition parts each have electrostatic diffusivity or conductivity, and
    forming an additional electric field between the second electrode and a third electrode facing the second electrode, wherein the third electrode includes an additional adsorption part that faces the adsorption part of the second electrode, the additional adsorption part having an insulating property,
    wherein the electric field causes the preformed blend particles to reciprocate between the disposition part and the adsorption part of the electrostatic adsorption device, thereby causing the conductive particles to detach from the intermediate particle and be dispersedly adsorbed onto the adsorption part, and
    wherein the additional electrical field causes the conductive particles dispersedly adsorbed onto the adsorption part to be electrostatically adsorbed onto the additional adsorption part.

2. The method for preparing dispersed conductive particles according to claim 1, wherein the particle size of the intermediate particle is 10 to 100 times the particle size of the conductive particles.

3. The method for preparing dispersed conductive particles according to claim 1, wherein the particle size of the conductive particles is 2 to 20 μm.

4. The method for preparing dispersed conductive particles according to claim 1, wherein the adsorption part has an opening pattern including a plurality of opening portions that open toward the disposition part of the first electrode.

5. The method for preparing dispersed conductive particles according to claim 1, wherein the additional adsorption part has an opening pattern including a plurality of opening portions that open toward the adsorption part of the second electrode.

6. A method for preparing dispersed conductive particles, the method comprising:
    disposing blend particles on a disposition part of a first electrode of an electrostatic adsorption device, wherein each of the blend particles comprises a plurality of the conductive particles attached to an intermediate particle that is larger in size than the conductive particles;
    forming an electric field between the first electrode and a second electrode of the electrostatic adsorption device, the second electrode including an adsorption part facing the disposition part of the first electrode, wherein the adsorption and disposition parts each have electrostatic diffusivity or conductivity, wherein the electric field causes the blend particles to reciprocate between the disposition part and the adsorption part of the electrostatic adsorption device, thereby causing the conductive particles to detach from the intermediate particle and be dispersedly adsorbed onto the adsorption part;

providing an additional electrostatic adsorption device including a third electrode including an additional adsorption part;

disposing the second electrode including the adsorption part on which the conductive particles dispersedly adsorbed so that the adsorption part faces the additional adsorption part; and forming an additional electric field between the second electrode and the third electrode of the additional adsorption device, wherein the additional adsorption part has an insulating property, and wherein the additional electrical field causes the conductive particles dispersedly adsorbed onto the adsorption part to be electrostatically adsorbed onto the additional adsorption part.

7. The method for preparing dispersed conductive particles according to claim 6, wherein the additional adsorption part has an opening pattern including a plurality of opening portions that open toward the adsorption part of the second electrode.

8. The method for preparing dispersed conductive particles according to claim 6, wherein the particle size of the intermediate particle is 10 to 100 times the particle size of the conductive particles.

9. The method for preparing dispersed conductive particles according to claim 6, wherein the particle size of the conductive particles is 2 to 20 μm.

* * * * *